United States Patent
Lindberg et al.

(10) Patent No.: US 8,848,018 B2
(45) Date of Patent: Sep. 30, 2014

(54) METHOD AND APPARATUS FOR PROVIDING VIDEO CALL SERVICE

(75) Inventors: Phillip Lindberg, Helsinki (FI); Ivan Dolgov, Espoo (FI)

(73) Assignee: TwineLAB Oy, Espoo (FI)

( * ) Notice: Subject to any disclaimer, the term of this patent is extended or adjusted under 35 U.S.C. 154(b) by 181 days.

(21) Appl. No.: 13/483,425

(22) Filed: May 30, 2012

(65) Prior Publication Data

US 2013/0321553 A1 Dec. 5, 2013

(51) Int. Cl.
*H04N 7/14* (2006.01)

(52) U.S. Cl.
CPC ............................... *H04N 7/14* (2013.01)
USPC ............... 348/14.02; 348/14.01; 348/14.12

(58) Field of Classification Search
USPC ............................................ 348/14.01–14.16
See application file for complete search history.

(56) References Cited

U.S. PATENT DOCUMENTS

| 6,590,601 | B2 * | 7/2003 | Sukeno et al. | 348/14.01 |
| 7,053,923 | B1 * | 5/2006 | Hamilton | 348/14.08 |
| 2004/0218035 | A1 * | 11/2004 | Crook | 348/14.02 |

* cited by examiner

*Primary Examiner* — Melur Ramakrishnaiah
(74) *Attorney, Agent, or Firm* — Ziegler IP Law Group, LLC

(57) ABSTRACT

A method for providing a video call service in a videophone apparatus comprising: establishing a peer-to-peer connection between the videophone apparatus and a peer over a wireless connection; generating a local video stream in the videophone apparatus based on a video signal provided by a camera of the videophone apparatus; and rendering the local video stream to provide a first preview video of the video call for a user of the videophone apparatus. The method further comprises receiving at least one frame of a peer video stream; rendering the at least one frame of the peer video stream to provide a second preview video of the video call for the user of the videophone apparatus; and cross-fading the second preview video with the received peer video stream in response to a frame rate of the peer video stream exceeding a threshold value.

17 Claims, 5 Drawing Sheets

METHOD AND APPARATUS FOR PROVIDING VIDEO CALL SERVICE

TECHNICAL FIELD

The present application generally relates to a method, a system and an apparatus for providing a video call service.

BRIEF DESCRIPTION OF RELATED DEVELOPMENTS

Due to recent advances of mobile telecommunications, popularity of mobile phones has been greatly increased. At the same time, the usage of fixed landline phone connections at home has been reduced. Video calls are widely used as a communication method providing people not only speech but streaming video of the other party as well. High-speed telecommunication networks enable video call activation between computers and cellular phones.

However, using computers or cellular phones for video calls has certain drawbacks. First, a video call is typically started with an audio connection and a video connection is set up with a slight delay. Especially with low bandwidth for the video call, the delay between the audio connection set up and the video connection set up may be disturbing for a user. The user may not know if the video connection is working at all or just being set up. Typically a blank video screen may be shown to the user while setting up the video connection. Second, the video connection set up phase using the blank screen may be disturbing to the user, as well as a still image used instead of the blank screen.

Thus, a solution is needed to provide a video call launch transition method that is easy-to-use, low-cost and highly-functional to provide the user a feeling that the video call is being set up and the video connection is opening as quickly as possible.

SUMMARY

According to a first example aspect of the disclosed embodiments there is provided a videophone apparatus comprising:
 a communication interface for communicating with a peer;
 at least one processor; and
 at least one memory including computer program code;
 the at least one memory and the computer program code configured to, with the at least one processor, cause the videophone apparatus to:
 establish a peer-to-peer connection between the videophone apparatus and the peer over a wireless connection;
 generate a local video stream in the videophone apparatus based on a video signal provided by a camera of the videophone apparatus;
 render the local video stream to provide a first preview video of the video call for a user of the videophone apparatus;
 receive at least one frame of a peer video stream;
 render the at least one frame of the peer video stream to provide a second preview video of the video call for the user of the videophone apparatus; and
 cross-fade the second preview video with the received peer video stream in response to a frame rate of the peer video stream exceeding a threshold value.

In an embodiment, the at least one memory and the computer program code configured to, with the at least one processor, cause the videophone apparatus further to:
 cross-fade the first preview video with the second preview video.

In an embodiment, the at least one memory and the computer program code configured to, with the at least one processor, cause the videophone apparatus further to:
 render the at least one frame of the peer video stream by dynamically changing at least one pixel value in the frame.

In an embodiment, the at least one memory and the computer program code configured to, with the at least one processor, cause the videophone apparatus further to:
 determine dynamic information based on the local video stream; and
 render the at least one frame of the peer video stream using the dynamic information.

In an embodiment, the at least one memory and the computer program code configured to, with the at least one processor, cause the videophone apparatus further to:
 determine the threshold value using resolution information of the peer video stream.

In an embodiment, the at least one memory and the computer program code configured to, with the at least one processor, cause the videophone apparatus further to:
 render the at least one frame of the peer video stream to provide a second preview video of the video call for the user of the videophone apparatus; and
 cross-fade the received peer video stream with the second preview video in response to a frame rate of the peer video stream declining below a threshold value.

In an embodiment, the at least one memory and the computer program code configured to, with the at least one processor, cause the videophone apparatus further to:
 render the at least one frame of the peer video stream to provide a second preview video of the video call for the user of the videophone apparatus; and
 cross-fade the received peer video stream with the second preview video in response to a disconnection of the peer-to-peer connection between the videophone apparatus and the peer.

In an embodiment, the at least one memory and the computer program code configured to, with the at least one processor, cause the videophone apparatus further to:
 provide a local call ending video in the videophone apparatus;
 cross-fade the received peer video stream with the call ending video in response to an end of the video call between the videophone apparatus and the peer.

In an embodiment, the at least one memory and the computer program code configured to, with the at least one processor, cause the videophone apparatus further to:
 provide a local call ending video in the videophone apparatus;
 transmit the local call ending video to the peer over the peer-to-peer connection for cross-fading a videophone apparatus video stream with the call ending video in response to an end of the video call between the videophone apparatus and the peer.

In an embodiment, the at least one memory and the computer program code configured to, with the at least one processor, cause the videophone apparatus further to:
 transmit the local video stream of the videophone apparatus to the peer for providing the video call;
 provide a local call ending video in the videophone apparatus;
 cross-fade the local video stream with the call ending video in response to an end of the video call between the videophone apparatus and the peer.

In an embodiment, wherein the call ending video comprising information of at least one of the following:
 a video call service provider;

a wireless connection service provider;
peer-to-peer connection information;
advertising information; and
news information.

According to a second example aspect of the disclosed embodiments there is provided a method for providing a video call service in a videophone apparatus comprising:

establishing a peer-to-peer connection between the videophone apparatus and a peer over a wireless connection;

generating a local video stream in the videophone apparatus based on a video signal provided by a camera of the videophone apparatus;

rendering the local video stream to provide a first preview video of the video call for a user of the videophone apparatus;

receiving at least one frame of a peer video stream;

rendering the at least one frame of the peer video stream to provide a second preview video of the video call for the user of the videophone apparatus; and cross-fading the second preview video with the received peer video stream in response to a frame rate of the peer video stream exceeding a threshold value.

In an embodiment, the method further comprising:
cross-fading the first preview video with the second preview video.

In an embodiment, the method further comprising:
rendering the at least one frame of the peer video stream by dynamically changing at least one pixel value in the frame.

In an embodiment, the method further comprising:
determining dynamic information based on the local video stream; and
rendering the at least one frame of the peer video stream using the dynamic information.

In an embodiment, the method further comprising:
determining the threshold value using resolution information of the peer video stream.

According to a third example aspect of the disclosed embodiments there is provided a computer program embodied on a computer readable medium comprising computer executable program code, which when executed by at least one processor of a videophone apparatus, causes the videophone apparatus to:

establish a peer-to-peer connection between the videophone apparatus and the peer over a wireless connection;

generate a local video stream in the videophone apparatus based on a video signal provided by a camera of the videophone apparatus;

render the local video stream to provide a first preview video of the video call for a user of the videophone apparatus;

receive at least one frame of a peer video stream;

render the at least one frame of the peer video stream to provide a second preview video of the video call for the user of the videophone apparatus; and cross-fade the second preview video with the received peer video stream in response to a frame rate of the peer video stream exceeding a threshold value.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
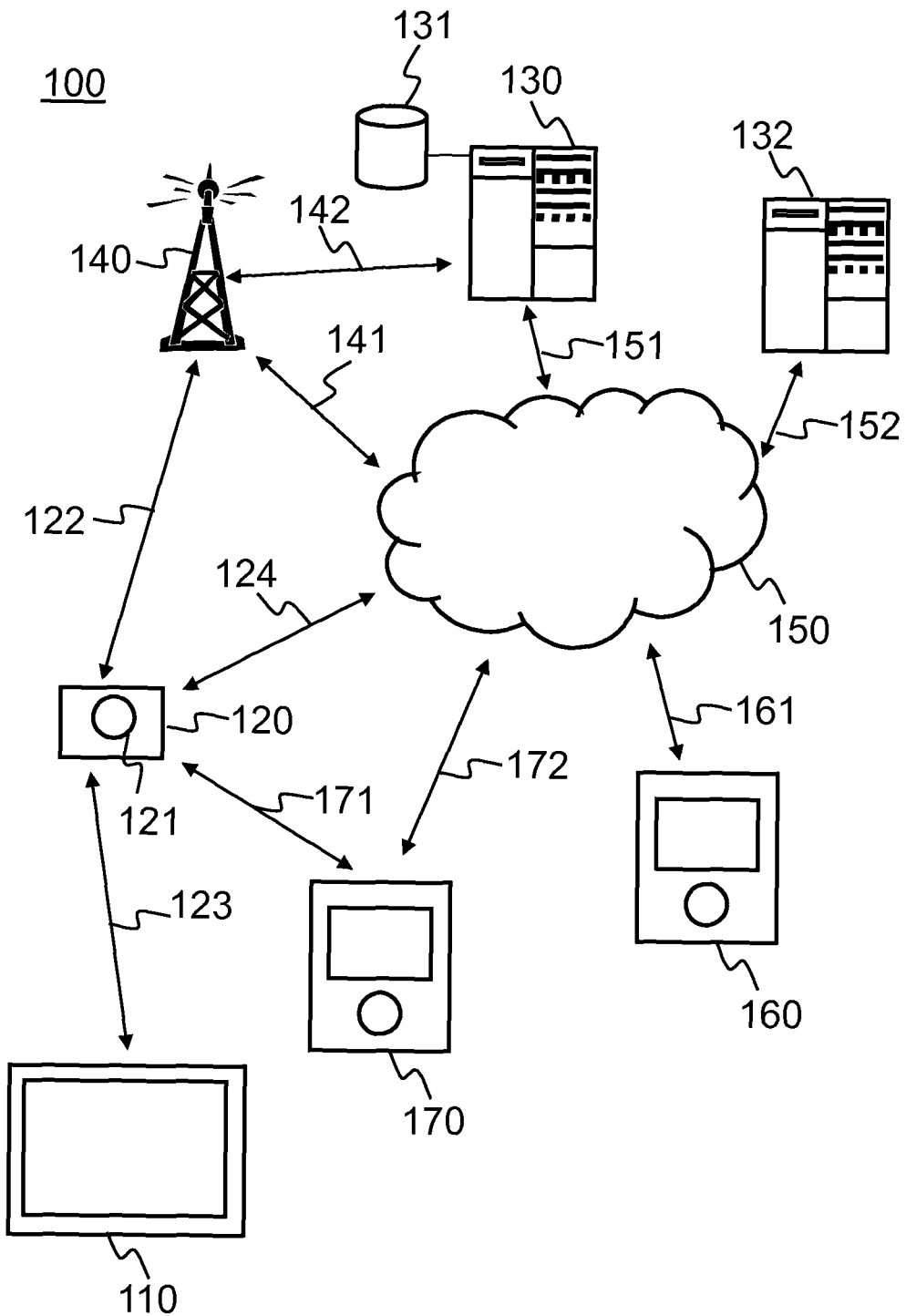
FIG. 1 shows a schematic picture of a system according to an aspect of the disclosed embodiments.

FIG. 1 shows a schematic picture of a system 100 according to an example embodiment. A user apparatus, such as a videophone apparatus 120 may comprise a mobile terminal comprising a camera and a communication interface. The videophone apparatus 120 may also comprise a videophone input apparatus without a display but using an A/V output apparatus 110 for displaying information, for example. The videophone apparatus 120 is capable of downloading and locally executing software program code. The software program code may be a client application of a service whose server application is running on a server apparatus 130, 132 of the system 100. The videophone apparatus 120 may comprise a camera 121 for providing video stream for the video call and a microphone for providing audio stream for the video call, for example.

In an embodiment, the videophone apparatus may comprise a ringer or a notification speaker 290. The videophone apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141. The videophone apparatus 120 is configured to be connectable to the public data communication network 150, for example the Internet, directly over a data connection 124 that may comprise a fixed broadband access.

In an embodiment, the system 100 comprises an A/V output apparatus 110 configured to be connectable to the videophone apparatus 120 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the A/V output apparatus 110 and the videophone apparatus 120, for example. The A/V output apparatus 110 may comprise a television, for example.

In an embodiment, the videophone apparatus 120 is integrated to the A/V output apparatus 110, such as a television, for example.

In an embodiment, the system 100 comprises a server apparatus 130, which comprises a storage device 131 for storing service data, service metrics and subscriber information, over data connection 151. The service data may comprise configuration data, account creation data, peer-to-peer service data over cellular network and peer-to-peer service data over wireless local area network (WLAN), for example. The service metrics may comprise operator information for use in both user identification and preventing service abuse, as the device 120 and the user account are locked to a subscriber of an operator network using the subscriber identity module (SIM) of the device 120 and the service account details.

In an embodiment, service data may travel over different paths. A first path may comprise sending configuration information over a wireless communication network 122, 140, 142 from the server apparatus 130. A second path may comprise sending account creation data between the server apparatus 130 and a peer-to-peer service apparatus 160 over the data connection 150, 151, 161, for example.

In an embodiment, a proprietary application in the videophone apparatus 120 may be a client application of a service whose server application is running on the server apparatus 130 of the system 100 and whose peer-to-peer client application is running on the peer-to-peer service apparatus 160. The proprietary application may capture the user input data for the videophone service and provide the user output data, from the peer, for the videophone service using the A/V output apparatus 110 over the local connection 123. In an embodiment, configuration information between the videophone apparatus 120 and the system server 130 is transceived via the first wireless connection 122, 140, 142 automatically and configured by the server apparatus 130. Thus the user of the videophone apparatus 120 may not need to do any initialization or configuration for the service. The system server 130 may also take care of account creation process for the service, such as videophone service between the videophone apparatus 120 and the peer 160.

In an embodiment, the system 100 comprises a service server apparatus 132, for storing service data, service metrics and subscriber information, over data connection 152. The service data may comprise service account data, peer-to-peer service data and service software, for example.

In an embodiment, a proprietary application in the videophone apparatus 120 may be a client application of a service whose server application is running on the server apparatus 132 of the system 100 and whose peer-to-peer client application is running on the peer-to-peer service apparatus 160. The proprietary application may capture the user input data for the videophone service and provide the user output data, from the peer, for the videophone service of the service server 132 using the A/V output apparatus 110 over the local connection 123. In an embodiment, configuration information between the videophone apparatus 120 and the system server 130 is transceived via the first wireless connection 122, 140, 142 automatically and configured by the system server apparatus 130. Furthermore, the system server apparatus 130 may automatically create a service account in the service server 132, for the videophone apparatus 120. Thus the user of the videophone apparatus 120 may not need to do any initialization or configuration for the service. Thus, the system server 130 may take care of account creation process for the service, such as videophone service between the videophone apparatus 120 and the peer 160.

In an embodiment, a videophone call may be established as a peer-to-peer connection between the videophone apparatus 120 and the peer 160 over a second wireless connection 122, 140, 141 to the public data communication network 150, 161 and to the peer 160. The second wireless connection 122, 140, 141 may comprise for example a wireless local area network connection.

In an embodiment, a videophone call may be established as a peer-to-peer connection between the videophone apparatus 120 and the peer 160 over a second wireless connection 122, 140, 142 to the public data communication network 150, 161 and to the peer 160. The second wireless connection 122, 140, 142 may comprise for example a cellular network connection provided by an operator of the system server 130.

In an embodiment, a videophone call may be established as a peer-to-peer connection between the videophone apparatus 120 and the peer 160 over a data connection 124 to the public data communication network 150, 161 and to the peer 160. The data connection 124 may comprise for example a wired local area network connection.

In an embodiment, the videophone apparatus 120 may be connected over a local connection 171 to a mobile apparatus 170, such as a mobile phone. The local connection may be a wireless connection and comprise Infrared, Bluetooth™, Radio Frequency Identification (RF-ID), wireless local area network (WLAN) or near field communication (NFC), for example. The mobile apparatus 170 may comprise, for example, a mobile phone, a tablet, a laptop or a remote controller. The mobile apparatus 170 may be used for remotely controlling the videophone apparatus 120.

In an embodiment, the videophone apparatus 120 may be connected over a local data connection 124 to a network 150, such as Internet, and furthermore over a data connection 172 to the mobile apparatus 170 and over a data connection 151 to a system server apparatus 130, 131. The local connection may be a wireless connection and comprise Infrared, Bluetooth™, Radio Frequency Identification (RF-ID), wireless local area network (WLAN) or near field communication (NFC), for example. The mobile apparatus 170 may comprise, for example, a mobile phone, a tablet or a laptop. The mobile apparatus 170 may be used for remotely controlling the videophone apparatus 120. The videophone apparatus 120 may be used primarily for consumption of media, whilst any configuration tasks (e.g. text entry for adding a friend to a contacts list) are performed elsewhere using existing tools with an appropriate affordance. In an embodiment, a web application utilizing the mobile apparatus 170 and a browser of the mobile apparatus 170 may be used to configure the videophone apparatus 120. The mobile apparatus 170 may be authenticated and configuration data sent from the mobile apparatus 170 to the system server 130, 131 wherein configuration settings for the videophone apparatus 120 are modified based on the received data. In an embodiment, the modified settings may then be sent to the videophone apparatus 120 over the network 150 and the local connection 124 or the wireless operator 141, 140, 122. For example, a SMS-based configuration message may be used to convey the configuration data.

In an embodiment, other services and service providers than videophone service may be used. In such cases, service account creation process may be automatic for third party services as well. The service account created (e.g. for the videophone service) to the system server 130, 131 may be used to create further accounts for each service the user may choose. Such account creation may be done machine-to-machine between the system server 130, 131 and any third party, such as the service server 132. Thus, the system server 130, 131 may host all account credentials on behalf of the user or the group of users (e.g. a family or associated group of professionals in an office).

In an embodiment, configuration information between the videophone apparatus and the system server may be transceived via the first wireless connection and a peer-to-peer connection may be established between the videophone apparatus and the peer over a second wireless connection. The first connection for configuration information may be transmitted over cellular data connection (e.g. 3G or 4G) and the second connection for peer-to-peer content may be transmitted over non-cellular data connection (e.g. wireless LAN). However, the first or the second connection may be used for both purposes.

In an embodiment, the videophone apparatus 120 may comprise an A/V input apparatus.

Figure 2:
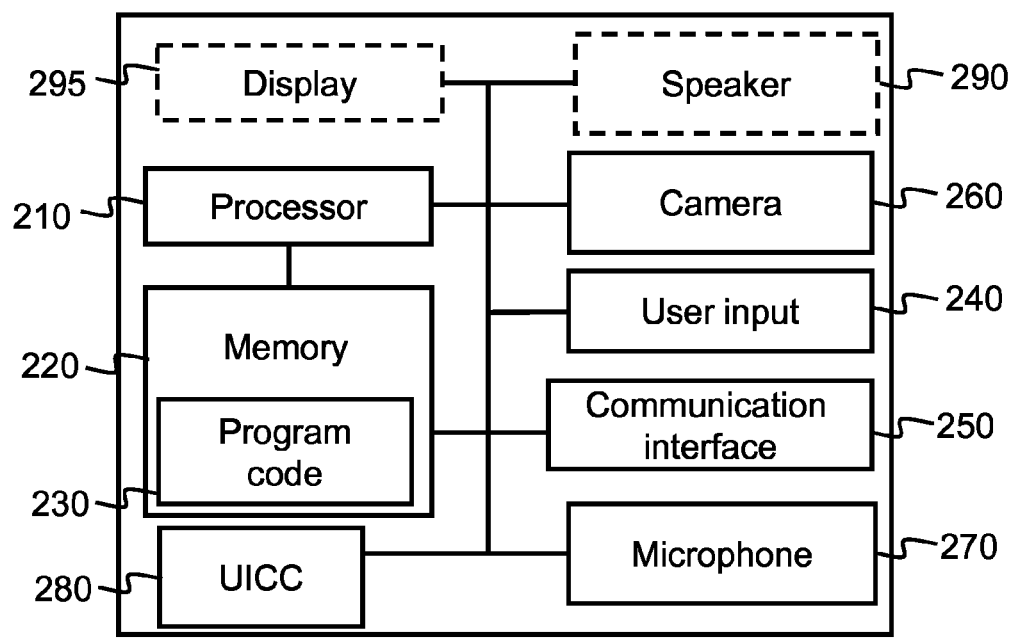
FIG. 2 presents an example block diagram of a videophone apparatus.

FIG. 2 presents an example block diagram of a videophone apparatus 120 in which various aspects of the disclosed embodiments may be applied. The videophone apparatus 120 may be a user equipment (UE), user device or apparatus, such as a mobile terminal, or other communication device comprising a communication interface, a camera and a microphone.

The general structure of the videophone apparatus 120 comprises a user input device 240, a communication interface 250, a microphone 270, a camera 260, a processor 210, and a memory 220 coupled to the processor 210. The videophone apparatus 120 further comprises software 230 stored in the memory 220 and operable to be loaded into and executed in the processor 210. The software 230 may comprise one or more software modules and can be in the form of a computer program product. The videophone apparatus 120 may further comprise a universal integrated circuit card (UICC) 280.

The processor 210 may be, e.g., a central processing unit (CPU), a microprocessor, a digital signal processor (DSP), a graphics processing unit, or the like. FIG. 2 shows one processor 210, but the videophone apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The videophone apparatus 120 may comprise a plurality of memories. The memory 220 may be constructed as a part of the videophone apparatus 120 or it may be inserted into a slot, port, or the like of the videophone apparatus 120 by a user. The memory 220 may serve the sole purpose of storing data, or it may be constructed as a part of an apparatus serving other purposes, such as processing data.

The user input device 240 may comprise circuitry for receiving input from a user of the videophone apparatus 120, e.g., via a keyboard, a touch-screen of the videophone apparatus 120, speech recognition circuitry, gesture recognition circuitry or an accessory device, such as a headset or a remote controller, for example.

The camera 260 may be a still image camera or a video stream camera, capable for creating multimedia data for videophone service.

The speaker 290 is configured to notify a user of an incoming call and to provide other user alarm sounds. Such speaker is advantageous especially in case the A/V output apparatus 110 (e.g. TV) is in off/standby mode. The speaker 290 also allows the user to answer the incoming call and hear the caller before turning the A/V output apparatus 110 (e.g. TV) on. Thus, the user may start the conversation while searching for a remote control of the A/V output apparatus 110 (e.g. TV), for example.

The microphone 270 is configured to capture user speech information for the video call service.

In an embodiment, the microphone 270 may be used to disable the speaker 290 when identical audio output is detected, using the microphone 270, from an external source, such as the A/V output apparatus 110. The device speaker 290 may only be required when the A/V output apparatus 110 (e.g. TV) is switched off or operating at very low volumes. The additional audio output from the A/V output apparatus 110 (e.g. TV) is at a variable distance from the microphone 270 (measured in time), compared to the on-board speaker 290 (internal source) which is at a fixed/known distance from the microphone 270. The identical audio output may be detected based on audio data comparison and based on distance calculation the audio data source may be determined to be the A/V output apparatus 110 (e.g. TV) and the speaker 290 may be switched off automatically. The universal integrated circuit card (UICC) 280 is the smart card used in mobile terminals in GSM and UMTS networks. The UICC 280 ensures the integrity and security of all kinds of personal data, and it typically holds a few hundred kilobytes. In a GSM network, the UICC 280 contains a SIM application and in a UMTS network the UICC 280 contains a USIM application. The UICC 280 may contain several applications, making it possible for the same smart card to give access to both GSM and UMTS networks, and also provide storage of a phone book and other applications. It is also possible to access a GSM network using a USIM application and it is possible to access UMTS networks using a SIM application with mobile terminals prepared for this.

In an embodiment the videophone apparatus 120 comprises a display 295 for presenting video phone related information to the user of the apparatus 120.

In an embodiment, the videophone apparatus 120 may be a videophone input apparatus without at least one of the speaker 290 and the display 295 (dash-line elements). In such case, an A/V output apparatus 110 may be used for user output data.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, or LTE (Long Term Evolution) radio module. The wired interface may comprise such as universal serial bus (USB), HDMI, SCART or RCA, for example. The communication interface module 250 may be integrated into the videophone apparatus 120, or into an adapter, card or the like that may be inserted into a suitable slot or port of the videophone apparatus 120. The communication interface module 250 may support one radio interface technology or a plurality of technologies. The communication interface module 250 may support one wired interface technology or a plurality of technologies. The videophone apparatus 120 may comprise a plurality of communication interface modules 250.

A skilled person appreciates that in addition to the elements shown in FIG. 2, the videophone apparatus 120 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the videophone apparatus 120 may comprise a disposable or rechargeable battery (not shown) for powering when external power if external power supply is not available.

In an embodiment, the videophone apparatus 120 comprises speech or gesture recognition means. Using these means, a pre-defined phrase or a gesture may be recognized from the speech or the gesture and translated into control information for the apparatus 120, for example.

Figure 3:
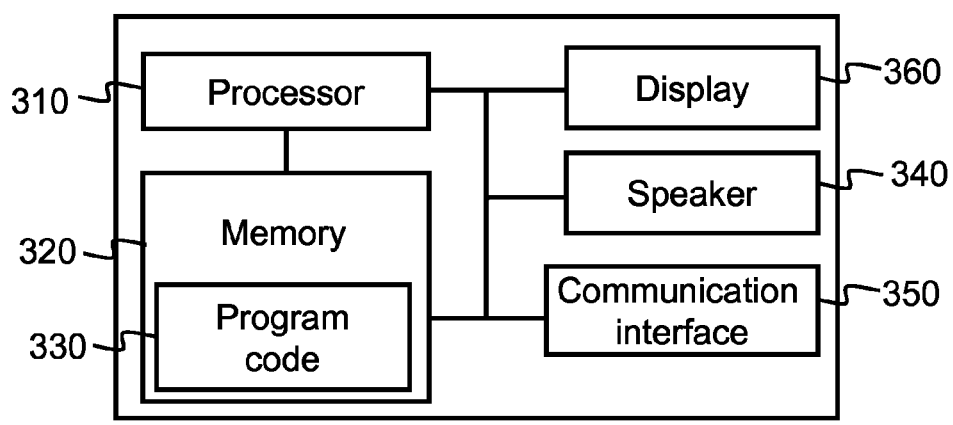
FIG. 3 presents an example block diagram of an A/V output apparatus.

FIG. 3 presents an example block diagram of an A/V output apparatus 110 in which various aspects of the disclosed embodiments may be applied. The A/V output apparatus 110 may be a television comprising a communication interface, a display and a speaker.

The general structure of the A/V output apparatus 110 comprises a communication interface 350, a display 360, a processor 310, and a memory 320 coupled to the processor 310. The A/V output apparatus 110 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the A/V output apparatus 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The A/V output apparatus 110 may comprise a plurality of memories. The memory 320 may be constructed as a part of the A/V output apparatus 110 or it may be inserted into a slot, port, or the like of the A/V output apparatus 110 by a user. The memory 320 may serve the sole purpose of storing data, or it may be constructed as a part of an apparatus serving other purposes, such as processing data.

The speaker 340 may comprise a loudspeaker or multiple loudspeakers. Furthermore, the speaker 340 may comprise a jack for headphones and the headphones.

The display 360 may comprise a LED screen, a LCD screen or a plasma screen, for example.

The communication interface module 350 implements at least part of data transmission. The communication interface module 350 may comprise, e.g., a wireless or a wired interface module. The wireless interface may comprise such as a WLAN, Bluetooth, infrared (IR) or radio frequency identification (RF ID) radio module. The wired interface may comprise such as universal serial bus (USB), HDMI, SCART or RCA, for example. The communication interface module 350 may be integrated into the A/V output apparatus 110, or into an adapter, card or the like that may be inserted into a suitable slot or port of the A/V output apparatus 110. The communication interface module 350 may support one radio interface technology or a plurality of technologies. The communication interface module 350 may support one wired interface technology or a plurality of technologies. The A/V output apparatus 110 may comprise a plurality of communication interface modules 350.

A skilled person appreciates that in addition to the elements shown in FIG. 3, the A/V output apparatus 110 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the A/V output apparatus 110 may comprise a disposable or rechargeable battery (not shown) for powering when external power if external power supply is not available.

Figure 4:
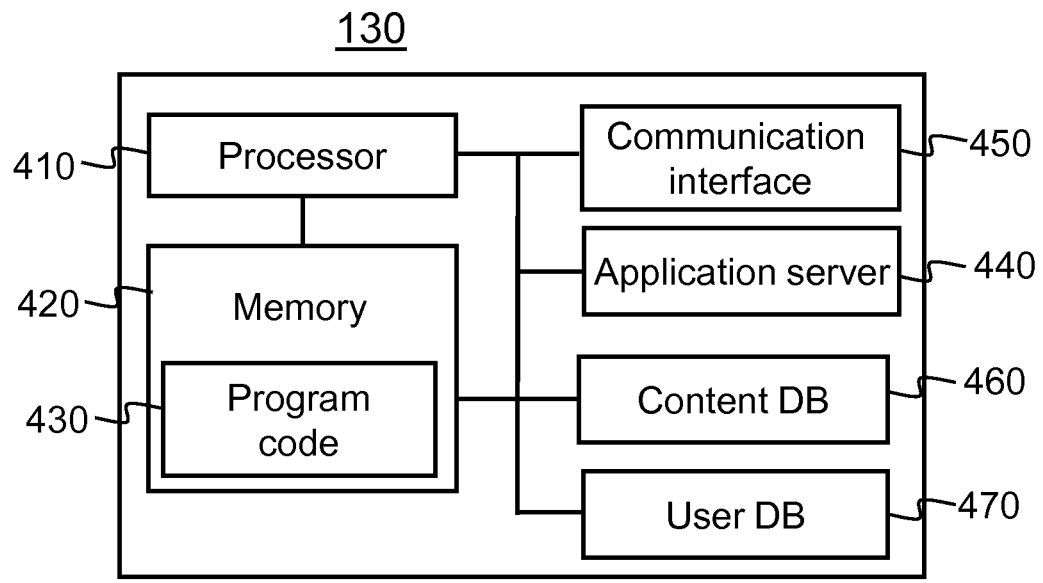
FIG. 4 presents an example block diagram of a server apparatus.

FIG. 4 presents an example block diagram of a server apparatus 130 in which various aspects of the disclosed embodiments may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. Configuration information between the videophone apparatus 120 and the system server 130 may be transceived using the communication interface 450. Similarly, account creation information between the system server 130 and a service provider may be transceived using the communication interface 450.

An application server 440 provides application services e.g. relating to the user accounts stored in a user database 470 and to the service information stored in a service database 460. The service information may comprise content information, content management information or metrics information, for example.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
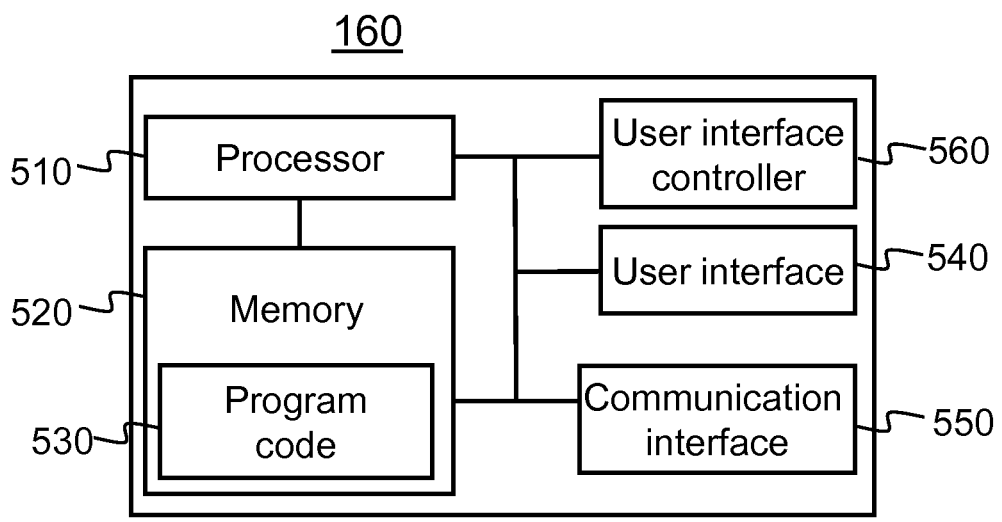
FIG. 5 presents an example block diagram of a peer apparatus.

FIG. 5 presents an example block diagram of a peer apparatus 160 in which various aspects of the disclosed embodiments may be applied. The peer apparatus 160 may be a user equipment (UE), user device or apparatus, such as a mobile terminal, a smart phone, a laptop computer, a desktop computer or other communication device.

The general structure of the peer apparatus 160 comprises a user interface 540, a communication interface 550, a processor 510, and a memory 520 coupled to the processor 510. The peer apparatus 160 further comprises software 530 stored in the memory 520 and operable to be loaded into and executed in the processor 510. The software 530 may comprise one or more software modules and can be in the form of a computer program product. The peer apparatus 160 may further comprise a user interface controller 560.

In an embodiment, the peer apparatus 160 may be remotely controlled by an external apparatus in a similar way as described before in this description between the videophone apparatus 120 and the mobile apparatus 170.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The peer apparatus 160 may comprise a plurality of memories. The memory 520 may be constructed as a part of the peer apparatus 160 or it may be inserted into a slot, port, or the like of the peer apparatus 160 by a peer user. The memory 520 may serve the sole purpose of storing data, or it may be constructed as a part of an apparatus serving other purposes, such as processing data.

The user interface controller 560 may comprise circuitry for receiving input from a user of the peer apparatus 160, e.g., via a keyboard, graphical user interface shown on the display of the user interfaces 540 of the peer apparatus 160, speech recognition circuitry, or an accessory device, such as a headset, and for providing output to the peer user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) or Ethernet, for example. The communication interface module 550 may be integrated into the peer apparatus 160, or into an adapter, card or the like that may be inserted into a suitable slot or port of the computer apparatus 160. The communication interface module 550 may support one radio interface technology or a plurality of technologies. The peer apparatus 160 may comprise a plurality of communication interface modules 550.

A skilled person appreciates that in addition to the elements shown in FIG. 5, the peer apparatus 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the peer apparatus 160 may comprise a disposable or rechargeable battery (not shown) for powering when external power if external power supply is not available.

Figure 6:
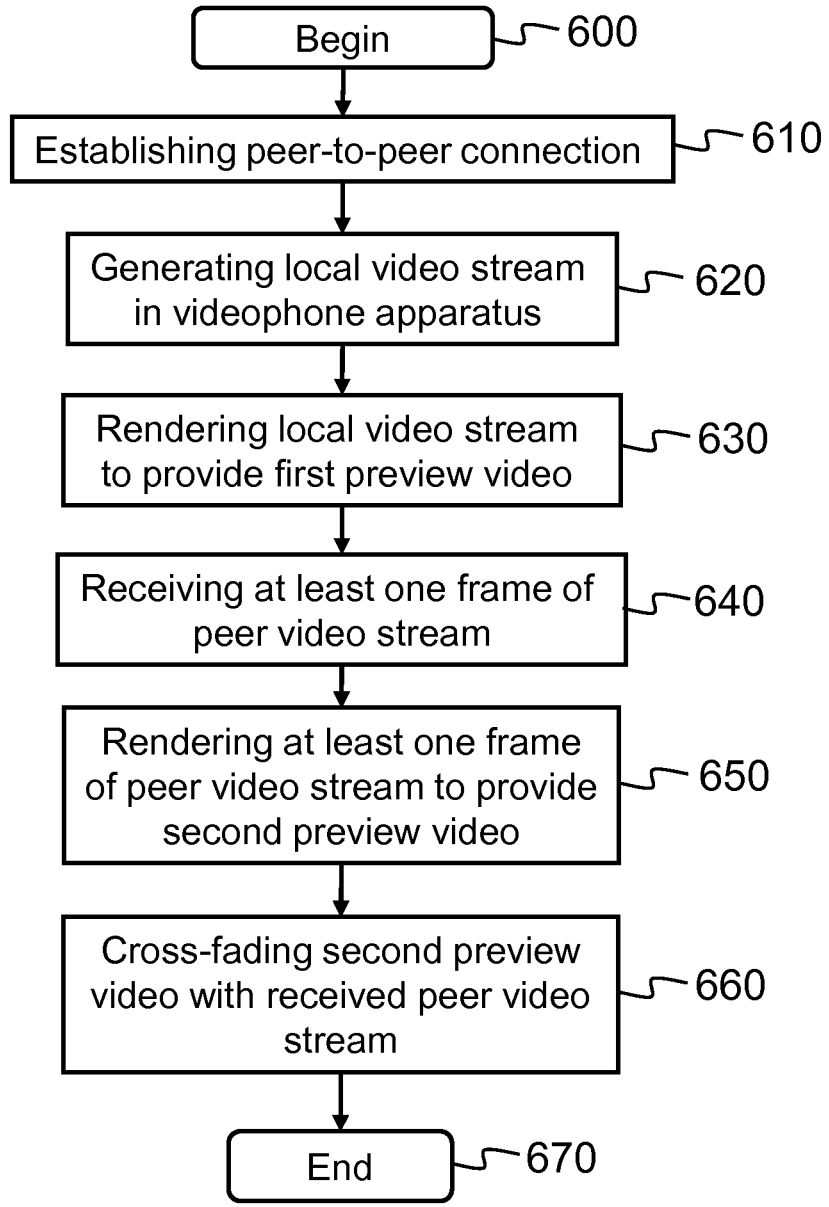
FIG. 6 shows a flow diagram showing operations in accordance with an aspect of the disclosed embodiments.

FIG. 6 shows a flow diagram showing operations in accordance with an example embodiment. In step 600, the method is started. In step 610, a peer-to-peer connection is established between the videophone apparatus and a peer over a wireless connection. In step 620, a local video stream is generated in the videophone apparatus based on a video signal provided by a camera of the videophone apparatus. In step 630, the local video stream is rendered to provide a first preview video of the video call for a user of the videophone apparatus. In step 640, at least one frame of a peer video stream is received. In step 650, rendering the at least one frame of the peer video stream to provide a second preview video of the video call for the user of the videophone apparatus. In step 660, cross-fading the second preview video with the received peer video stream in response to a frame rate of the peer video stream exceeding a threshold value. The method is ended in step 670.

Figure 7:
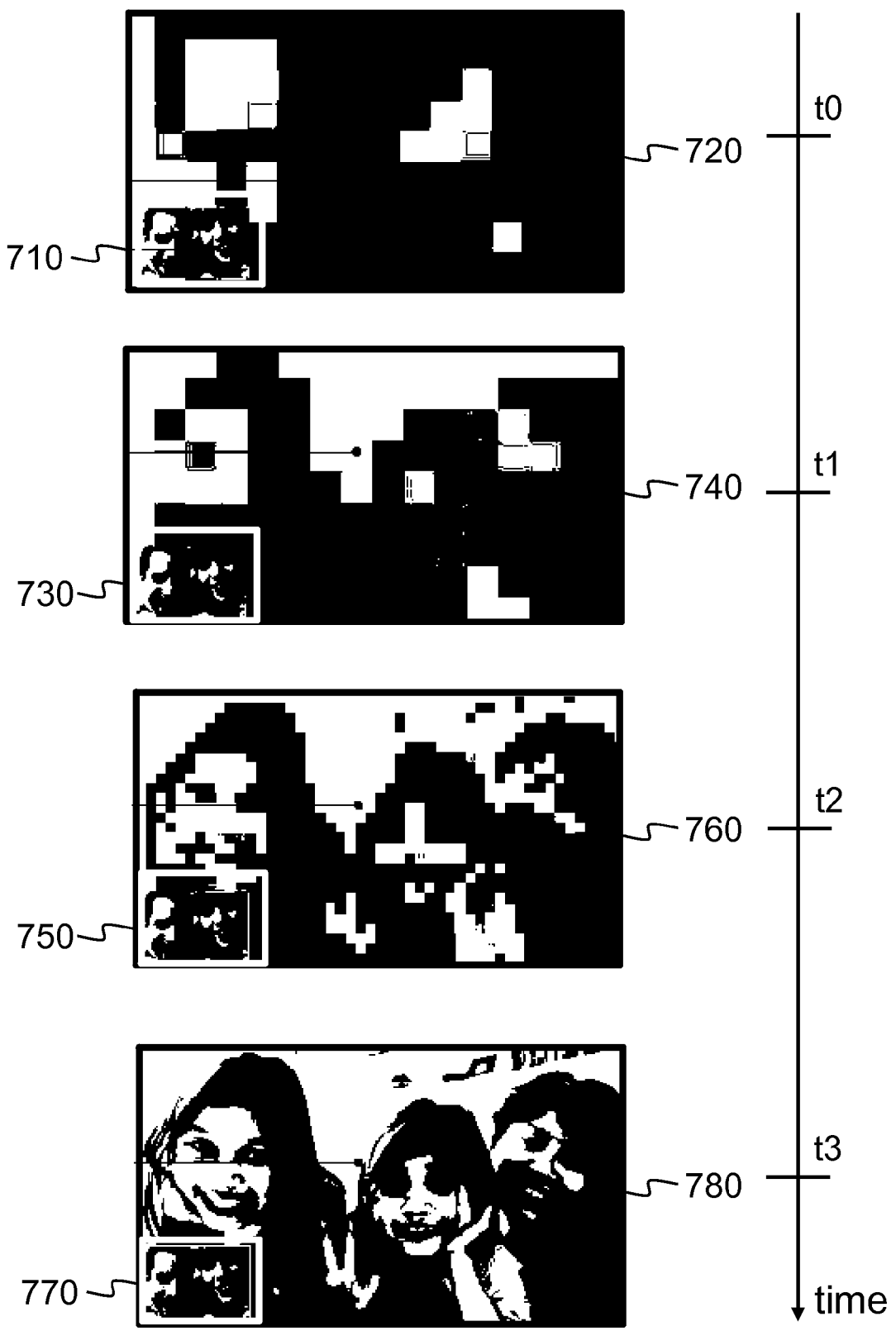
FIG. 7 shows a schematic picture of steps relating to a videophone apparatus according to an example embodiment.

FIG. 7 shows a schematic picture of steps relating to a videophone apparatus according to an example embodiment.

Time t0 may represent a moment right after a video call connection between a videophone apparatus and a peer is established. At t0 an audio connection for the call may be opened. On a display of the videophone apparatus a reduced window 710 presents a video stream of a videophone apparatus user. Such stream is provided by a local camera of the videophone apparatus. A full screen window 720, on the display of the videophone apparatus, presents a video stream of a peer user. However, at t0, the videophone apparatus may not yet have incoming video stream received from the peer with sufficient frame rate. The connection established for the video call may be limited in speed and the establishment of audio connection reduces the frame rate for the video stream.

In an embodiment, an image for full screen window 720 is generated by using a local video image presented also in window 710 to fill the void prior to an incoming video signal being received with sufficient frame rate. A control algorithm manipulates the local preview video image of window 710 to render it unrecognizable, such as an abstract pixilation, for example. The full screen image of window 720 is however made dynamic in nature by providing moving pixels in the image, by the algorithm. Such dynamic nature provides the user an impression that the video stream of the peer is starting up.

In an embodiment, at t1, a first frame of the incoming video from the peer is received. The received frame replaces the locally generated video image of window 720. The control algorithm manipulates the received frame to render it unrecognizable and video information of window 720 may be cross-faded to video information of window 740, as shown in full screen window 740. The incoming video stream may be used for the purpose for determining color information to modify the local video image. For example, reference RGB values may be retrieved from the incoming video image frame and used to modify the local video image hue. Such solution directs the local video image towards the anticipated incoming video stream. The local video stream of the user of the videophone apparatus is shown in video frame 730. Dynamics for the full screen image of window 740 are defined using the local image of window 730. Such dynamics reduces the static impression.

In an embodiment, at t2, the frame rate for the received peer video stream is increased to a certain level. Such level triggers the control algorithm to reduce the level of distortion in window 760. The video information presented in window 740 may be cross-faded to video information presented in window 760. The video information presented in window 760 may comprise the peer video stream. Phase of t2 may be relatively shorter than t1 due higher frame rate being typically high enough for setting up the video connection.

In an embodiment, at t3, the frame rate for the received peer video stream is increased to a normal level. Resolution or frame rate may also be altered and both offered with reduced bandwidth at lower levels. Resolution is often the preferred variable to modify—often a pixilated image is preferable to low frame rate (jumpy video) from a user experience point of view. Such level triggers the control algorithm to minimize the level of distortion in window 780. The video information presented in window 760 may be cross-faded to video information presented in window 780. The video information presented in window 780 may thus comprise the peer video stream in full frame rate available over the video call connection, In an embodiment, t0 may correspond to 0.5 second from the video call connection establishment. After t0, t1 may take 2-5 seconds from t0, t2 1 second from t1, and t3 0.5 second from t2, for example.

Thus, a smooth and effective cross-fading to the live incoming video stream from the peer may be provided. Furthermore, the perceived quality of the video call connection experience is improved for the local user. The method may appear to align the video stream with the audio stream, which is usually established first due to low bandwidth requirements. However, a "jarring" experience with prolonged "black" screen periods may be reduced or even removed totally.

In an embodiment, received peer video stream may be cross-faded with the second preview video rendered of the peer video stream in response to a frame rate of the peer video stream declining below a threshold value. Thus, in case the peer video stream frame rate reduces below certain limit, the cross-fading may be used. Such solution reduces jamming and stalling.

In an embodiment, received peer video stream may be cross-faded with the second preview video in response to a disconnection of the peer-to-peer connection between the videophone apparatus and the peer. If the video call connection is disconnected, the cross-faded video stream reduces the blank screens or stalling of the video stream and improving the user experience of the service. Similar solution may be used also in case the video call ends but the peer-to-peer connection is still active.

In an embodiment, a local call ending video is provided in the videophone apparatus. The received peer video stream may then be cross-faded with the call ending video in response to an end of the video call between the videophone apparatus and the peer. Similarly, the cross-fading may be done in case the peer-to-peer connection is disconnected.

In an embodiment, the local call ending video may be transmitted to the peer over the peer-to-peer connection for cross-fading a videophone apparatus video stream with the call ending video in response to an end of the video call between the videophone apparatus and the peer. Thus, the peer may receive the call ending video before the peer-to-peer connection is disconnected and display the call ending video before the video call is ended, to the peer user.

In an embodiment, the local video stream of the videophone apparatus is transmitted during the video call to the peer for providing the video call service. The local call ending video may be provided in the videophone apparatus for call ending purposes and when the video call is detected to be ended, the local video stream may be cross-faded with the call ending video in response to an end of the video call between the videophone apparatus and the peer. The detection of the video call end may be based on call ending signals from either the videophone apparatus or the peer, for example.

In an embodiment, the call ending video may be generated in the videophone apparatus, in the wireless operator server, in the video call service provider server or the peer, for example.

In an embodiment, the call ending video may comprise information of at least one of the following: a video call service provider; a wireless connection service provider; peer-to-peer connection information; advertising information; and news information. The service provider information may comprise for example advertisements of new services or pricing information. The peer-to-peer connection information may comprise details of the disconnected video call, such as duration and costs, for example. Advertising information may comprise any third party advertisements, for example. The news information may comprise latest news relating to areas selected by the user, for example.

In an embodiment, any of the videos, video streams and image frames may be displayed to the user of the videophone apparatus using a display of the videophone apparatus or an A/V output apparatus, for example.

In an embodiment, any of the videos, video streams and image frames may be displayed to the peer user of the peer apparatus using a display of the peer apparatus or an A/V output apparatus, for example.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the disclosed embodiments are set out in the independent claims, other aspects comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A videophone apparatus, for providing a video call service, comprising:
   a communication interface for communicating with a peer;
   at least one processor; and
   at least one memory including computer program code;
   the at least one memory and the computer program code configured to, with the at least one processor, cause the videophone apparatus to:

establish a peer-to-peer connection between the videophone apparatus and the peer over a wireless connection;
generate a local video stream in the videophone apparatus based on a video signal provided by a camera of the videophone apparatus;
render the local video stream to provide a first preview video of the video call for a user of the videophone apparatus;
receive at least one frame of a peer video stream;
render the at least one frame of the peer video stream to provide a second preview video of the video call for the user of the videophone apparatus; and
cross-fade the second preview video with the received peer video stream in response to a frame rate of the peer video stream exceeding a threshold value.

2. The videophone apparatus of claim 1, the at least one memory and the computer program code configured to, with the at least one processor, cause the videophone apparatus further to:
cross-fade the first preview video with the second preview video.

3. The videophone apparatus of claim 1, the at least one memory and the computer program code configured to, with the at least one processor, cause the videophone apparatus further to:
render the at least one frame of the peer video stream by dynamically changing at least one pixel value in the frame.

4. The videophone apparatus of claim 3, the at least one memory and the computer program code configured to, with the at least one processor, cause the videophone apparatus further to:
determine dynamic information based on the local video stream; and
render the at least one frame of the peer video stream using the dynamic information.

5. The videophone apparatus of claim 1, the at least one memory and the computer program code configured to, with the at least one processor, cause the videophone apparatus further to:
determine the threshold value using resolution information of the peer video stream.

6. The videophone apparatus of claim 1, the at least one memory and the computer program code configured to, with the at least one processor, cause the videophone apparatus further to:
cross-fade the received peer video stream with the second preview video in response to a frame rate of the peer video stream declining below a threshold value.

7. The videophone apparatus of claim 1, the at least one memory and the computer program code configured to, with the at least one processor, cause the videophone apparatus further to:
cross-fade the received peer video stream with the second preview video in response to a disconnection of the peer-to-peer connection between the videophone apparatus and the peer.

8. The videophone apparatus of claim 1, the at least one memory and the computer program code configured to, with the at least one processor, cause the videophone apparatus further to:
provide a local call ending video in the videophone apparatus;
cross-fade the received peer video stream with the call ending video in response to an end of the video call between the videophone apparatus and the peer.

9. The videophone apparatus of claim 1, the at least one memory and the computer program code configured to, with the at least one processor, cause the videophone apparatus further to:
provide a local call ending video in the videophone apparatus;
transmit the local call ending video to the peer over the peer-to-peer connection for cross-fading a videophone apparatus video stream with the call ending video in response to an end of the video call between the videophone apparatus and the peer.

10. The videophone apparatus of claim 1, the at least one memory and the computer program code configured to, with the at least one processor, cause the videophone apparatus further to:
transmit the local video stream of the videophone apparatus to the peer for providing the video call;
provide a local call ending video in the videophone apparatus;
cross-fade the local video stream with the call ending video in response to an end of the video call between the videophone apparatus and the peer.

11. The videophone apparatus of claim 10, wherein the call ending video comprising information of at least one of the following:
a video call service provider;
a wireless connection service provider;
peer-to-peer connection information;
advertising information; and
news information.

12. A method for providing a video call service in a videophone apparatus comprising:
establishing a peer-to-peer connection between the videophone apparatus and a peer over a wireless connection;
generating a local video stream in the videophone apparatus based on a video signal provided by a camera of the videophone apparatus;
rendering the local video stream to provide a first preview video of the video call for a user of the videophone apparatus;
receiving at least one frame of a peer video stream;
rendering the at least one frame of the peer video stream to provide a second preview video of the video call for the user of the videophone apparatus; and
cross-fading the second preview video with the received peer video stream in response to a frame rate of the peer video stream exceeding a threshold value.

13. The method of claim 12, further comprising:
cross-fading the first preview video with the second preview video.

14. The method of claim 12, further comprising:
rendering the at least one frame of the peer video stream by dynamically changing at least one pixel value in the frame.

15. The method of claim 14, further comprising:
determining dynamic information based on the local video stream; and
rendering the at least one frame of the peer video stream using the dynamic information.

16. The method of claim 12, further comprising:
determining the threshold value using resolution information of the peer video stream.

17. A computer program embodied on a computer readable non-transitory medium comprising computer executable program code, which when executed by at least one processor of a videophone apparatus, causes the videophone apparatus to:

establish a peer-to-peer connection between the videophone apparatus and the peer over a wireless connection;
generate a local video stream in the videophone apparatus based on a video signal provided by a camera of the videophone apparatus;
render the local video stream to provide a first preview video of the video call for a user of the videophone apparatus;
receive at least one frame of a peer video stream;
render the at least one frame of the peer video stream to provide a second preview video of the video call for the user of the videophone apparatus; and
cross-fade the second preview video with the received peer video stream in response to a frame rate of the peer video stream exceeding a threshold value.

* * * * *